United States Patent [19]

Yalpani et al.

[11] Patent Number: 4,906,579
[45] Date of Patent: Mar. 6, 1990

[54] NEW CATALYTICALLY OXIDIZED POLYGLUCOSIC UNITS AND METHODS OF MAKING SAME LEADING TO ALDEHYDE GROUPS ON THE C-6 POSITION OF POLYGLUCOSIC PRODUCT AND NEW PRODUCTS THEREFROM

[75] Inventors: Manssur Yalpani; Magdy M. Abdel-Malik, both of Kirkland, Canada

[73] Assignee: Domtar Inc, Montreal, Canada

[21] Appl. No.: 186,369

[22] Filed: Apr. 26, 1988

Related U.S. Application Data

[63] Continuation-in-part of Ser. No. 177,430, Apr. 1, 1988, abandoned.

[51] Int. Cl.$^4$ .......................... C08B 16/00; C08B 3/06; C08B 1/02; C08B 15/05
[52] U.S. Cl. ....................................... 536/56; 536/58; 536/63; 536/69; 536/74; 536/101; 536/102; 536/103; 536/122
[58] Field of Search ....................... 536/56, 58, 63, 69, 536/74, 102, 103, 122, 101

[56] References Cited

U.S. PATENT DOCUMENTS 4,531,000 7/1985 Yalpani .................................. 536/14

FOREIGN PATENT DOCUMENTS 7563066 9/1973 Japan .

Primary Examiner—John Kight
Assistant Examiner—Nathan M. Nutter
Attorney, Agent, or Firm—Antoine H. Gauvin

[57] ABSTRACT

A method to selectively oxidize a polyglucose, on the oxygen of the hydroxy groups of the C-6 position of the glucose rings, while substantially maintaining the degree of polymerization of the polyglycosidic units, comprising heating a 6-sulfonyl polyglucose, for instance 6-O-para-(P)-toluene sulfonyl polyglucose with dimethyl sulfoxide (DMSO) in the presence of at least a catalytic amount of a catalyst selected from a member of the group consisting of: symmetrical—collidine, sodium bicarbonate and pyridine, to produce a polyglucose having aldehyde groups on the oxygen of the hydroxyl on the C-6 position of the glucose rings. In a preferred embodiment when pyridine is selected, this method enables use of that reaction to obtain other new products having other functional groups, mainly on the C-6 position of the glucose rings, without having to purify the aldehyde which may serve as intermediate.

31 Claims, No Drawings

NEW CATALYTICALLY OXIDIZED POLYGLUCOSIC UNITS AND METHODS OF MAKING SAME LEADING TO ALDEHYDE GROUPS ON THE C-6 POSITION OF POLYGLUCOSIC PRODUCT AND NEW PRODUCTS THEREFROM

This is a continuation-in-part of application Ser. No. 07/177,430 filed Apr. 1st, 1988 now abandoned.

This invention relates to new oxidized polyglucosidic units and to the methods of making same. This invention is particularly directed to the catalytic oxidation of such glucosidic units in a given position, while maintaining substantially the degree of polymerization of the polymeric glucosidic units i.e. without breaking the chain length, thereby producing oxidation of high specificity and in high yields.

BACKGROUND OF THE INVENTION

There are numerous products that are known to contain polyglucosidic units which we shall call "polyglucose" or "polyglucoses" hereinafter, for instance cellulose.

Cellulose has the following general formula $(C_6H_{10}O_6)_n$ and may be represented as:

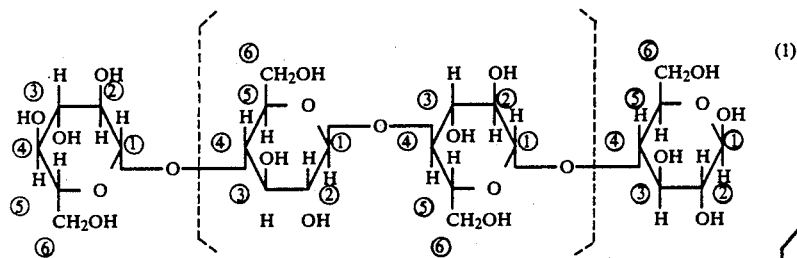

On the basis of conformational analysis, a better structural presentation is probably given by formula (2).

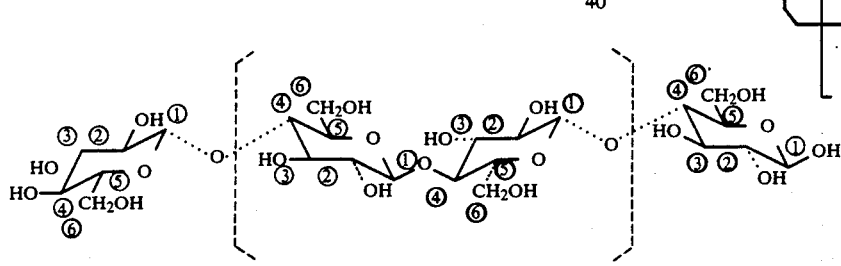

Where n is of the order of for instance 300 to 500, and possibilities exist that the beta 1,4-linkage may be other than the glucosidic bonds, but to a minor extent.

Dextrins have the general formula $(C_6H_{10}O_5)n \times H_2O$ are for instance obtained by controlled hydrolysis of starch and may also be represented by the formulation shown at (3). In the case of cylic dextrins, also called cyclodextrins:

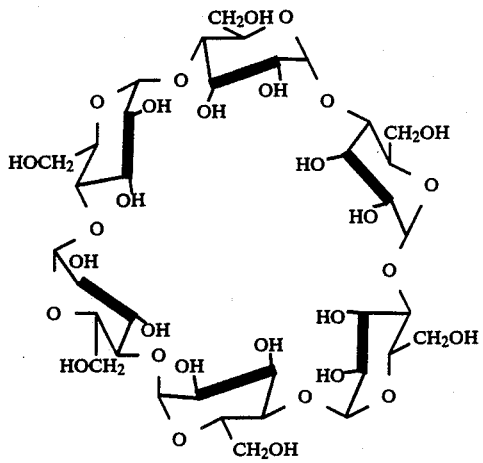

Cyclodextrins may also be represented by the following formula:

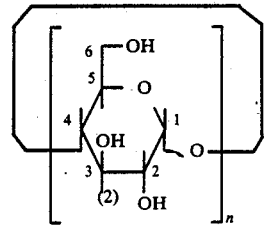

where
for alpha-cyclodextrin n is 6,
for beta-cyclodextrin n is 7, and
for gamma cyclodextrin n is 8
Where according to the chain length, the letters alpha, beta, gamma and so on are given.

There are no chemical methods available at this time for the quantitative and selective oxidation of the primary hydroxyl functions of glucose-containing products such as polysaccharides and dextrins: In general, oxidation is partial or complete, producing many products and fragments. While the complete conversion of the primary hydroxyl functions of alpha- and beta-cyclodextrin can be accomplished by use of either catalytic oxidation (O₂/Pt) or nitrogen dioxide (N₂O₄) treatments (Casu, B., Scovenna, G., Cifonelli, A. J. and Perlin, A. S., Carbohydrate Research, 63, 13, 1968), the application of equivalent techniques to polysaccharides results in the formation of either substantially depolymerized materials, or product mixtures containing both acid and aldehyde groups (Pigman, W. W., Browning, B. L., McPherson, W. H., Calkins, C. R. and Leaf, R. L., J. Am. Chem. Soc., 71, 2200, 1949). Secondary hydroxyl functions, however, are also oxidized to some extent, and nitrogen is incorporated in the form of nitrites or nitrates.

The nitrogen dioxide oxidation method can, for example, be employed for the preparation of heparin analogues derived from amylose, cellulose, guar gum and locust bean gum, for which C-6 oxidation yields of between 20–60% are obtainable but with depolymerization (Hoffman, J., Larm, O., Larsson, K., Andersoon, L. O., Holmer, E. and Söderström, G., Carbohydr. Polym., 2, 115–121, 1982). For cellulose the application of nitrogen dioxide in the gas phase or dissolved in carbon tetrachloride results in the predominant formation of D-glucuronic acid residues (Allen, T. C. and Cuculo, J. A., J. Polym. Sci., Macromol. Rev., 7, 189, 1973). Nitrogen dioxide treatment of bleached sulphate pulp introduces 0.7 mmol carboxyl residues per gram of cellulose; prolonged oxidation results in the formation of carbonyl functions and a severe reduction of the degree of polymerization (Luzakova, V., Marcincinova, T. and Blazej, A., Cell. Chem. Technol., 17, 227–235, 1983).

Another method for the preferential oxidation of primary hydroxyl functions involves the use of oxygen and Adams catalyst. This method introduces furanosyluronic and pyranosyluronic acid residues into polysaccharides. Treatment of rye-flour arabinoxylan and European larch arabinogalactan, two highly branched polysaccharides with oxygen, Adams catalyst and sodium hydrogen carbonate for 4 and 14 days, respectively, reportedly afforded the corresponding oxidized products containing 4% and 7.5% carboxyl functions (Aspinall, G. O. and Nicolson, A., J. Chem. Soc., 2503, 1960; Aspinall, G. O. and Cairncross, I. M., J. Chem. Soc., 3998, 1960). The unfavourably long reaction periods and low yields clearly limit the utility of this method. Similarly low yields are reported for the application of this catalytic oxidation method to 1,4-linked polysaccharides (Heyns, K. and Beck, M., cited as unpublished results in Heyns, K. and Paulson, H., Adv. Carbohydr. Chem. Biochem., 17, 194, 1962).

A patent disclosure by J. Hamuro (Japanese disclosure 75-54684, dated May 14, 1975) claims the preparation of polysaccharide polyaldehyde derivatives via the treatment of polysaccharide sulfonate or halogen derivatives with a sulfoxide or amine oxide. The process as described, requires the isolation and drying of the polysaccharide sulfonate intermediates prior to further derivatization. The subsequent modifications with dimethyl sulfoxide or pyridine-N-oxide were conducted at elevated temperatures (100°–500° C.) in the absence of any catalyst, and required reaction periods of 0.5–1.0 hours. The yields reported for the claimed polyaldehyde polysaccharide derivatives were very low, reaching degrees of substitution (DS) of only about 0.13. A closer examination of the claims made shows, however, the following points: the inventor claims infrared evidence (absorption at 1710–1700 cm⁻¹) for the presence of the aldehyde functions combined with decreased absorptions (at 1602, 1360, 1170, and 810 cm⁻¹) from which a degree of conversion into the polyaldehyde product of 70–90% is deducted. Whether any aldehyde functions introduced by the claimed process would be present, is questionable, in view of the well established fact, that aldehyde functions (introduced, for example, via periodate oxidation or similar means) of polysaccharides may undergo a series of inter- and intra-molecular condensation reactions in aqueous media (as are employed for the workup and isolation of the oxidized products) or upon drying. While the above-cited high conversion efficiencies of 70–90% are claimed on the one hand, the degree of aldehyde substitution is stated to be only 0.11, 0.13 and 0.20 for amylose, cellulose, and pachymaran derivatives, respectively, based on sodium borohydride reduction of the polyaldehydes.

THE INVENTION

Broadly stated, the invention is directed to a new method to selectively oxidize a polyglucose on the oxygen of the hydroxy group of the C-6 position of the glucose rings, the degree of polymerization of the polyglucose, remaining substantially the same (i.e. without breaking chain length), comprising heating a 6-sulfonyl polyglucose such as 6-O- paratoluene sulfonyl polyglucose and the like with dimethyl sulfoxide (DMSO) in the presence of at least a catalytic amount of a catalyst selected from the group consisting of:
  symmetrical-collidine,
  sodium bicarbonate and
  pyridine,
to produce a polyglucose having aldehyde groups on the carbon of the hydroxyl on the C-6 position of the glucose rings the aldehyde group.

The heating in this reaction is generally at 150±10° C. and preferably near 150° C. in an inert medium, such as under nitrogen, with DMSO acting as oxidizing agent.

In a particular embodiment the 6-O-paratoluenesulfonyl polyglucose is obtained in situ by:
(a) wetting a compatible polyglucose in pyridine,
(b) reacting said polyglucose in said pyridine, with about three moles of a sulfonyl chloride, preferably para-toluene sulfonyl chloride, per mole of glucosidic units, thereby obtaining in suspension in said pyridine said 6-O-p-toluenesulfonyl polyglucose, or other 6 sulfonyl polyglucose, and without purification or isolation directly adding said DMSO, wherein the solvent in step (a) is simulataneously used as catalyst for carrying out the method for selectively oxidizing said polyglucose into a polyglucose having aldehyde groups on the C-6 position, in an heterogeneous fashion, i.e. as a slurry.

This invention is particularly applicable to polyglucoses having branched or unbranched glucose rings, such as cellulose and derivatives therefrom, for instance, of the cellulose acetate types such as cellulose diacetate and triacetate and mixtures thereof, and other polyglucoses, providing some primary alcohol functions are available as for example dextrins.

Typical examples of other polyglucoses that may be used include starch, chitin, chitosan, gums such as guar gum, xanthan gum, other saccharides, alginic acid, polymannuronic acids, polyglycosuronic and guluronic acids, mannans, as well as other synthetic or natural polyglucoses having 1,4 or 1,3-linkages.

To carry out the sulfonation in a single reactor, polyglucoses soluble in pyridine are preferrable.

Among the sulfonyl chlorides the most preferred is P-toluenesulfonyl chloride but, may also be meta- or orto- toluenesulfonyl chloride. Other alkyl benzene sulfonate chloride, including methane sulfonate and the like are also contemplated.

Once the polyaldehydes are produced mainly on the C-6 position of the glucose rings, they can be modified into new products having other functional groups on the C-6 position of the glucose rings, such as amines by simply adding ammonium acetate or ammonia or secondary amines under reducing condition such as with sodium cyanoborohydride, or sodium borohydride or other appropriate reducing agents (e.g. catalytic reduction with hydrogen and palladium or platinum) or amide by carrying the same reaction out without reducing the reagent.

The polyaldehydes can also be converted into a hydrazones by reacting with 2,4-dinitrophenyl hydrazine or hydrazine. Still the polyaldehydes can be converted into the carboxylates by oxidation such as with bromine or sodium hypochlorite in an alkaline medium. Other new products are also possible, for instance, in the case of cellulose acetate, the polyaldehydes can be hydrolyzed with a Lewis acid or base to remove the acetate groups.

In all these changes of the aldehyde functional group indicated hereinabove, the degree of polymerization of the polyglucoses units remain substantially the same.

To determine the molecular weight of these polyglucoses materials which are polymeric in nature, size exclusion chromatography (SEC) has been used. It is a relative method based on the differential rate of permeation of differently-sized molecules through the porous chromatographic column packing matrix. Larger molecules interact less extensively with the chromatographic matrix than smaller molecules and are hence eluted in shorter periods (shorter retention times), the latter constituting therefore an indirect measure of molecular weight. Molecular weight determinations are based on comparisons of the retention times ("R.T." as will be used throughout the application) of unknowns against those of calibration standards, bearing in mind that since the molecular shape of polymers depends on their chemical nature, calibration standards should be as closely as possible related in chemical composition to that of the unknown. In many cases, such ideal calibration standards are not possible, the determination remains thus relative unless the SEC technique is combined with an absolute molecular weight determination method. The molecular weights of the cellulose derivatives reported here are based on comparison relative to polystyrenesulfonate derivatives, and thereby providing a clear indication of relative changes in molecular weights.

In the invented reactions, in addition to minimizing the depolymerization of the polyglucose, as referred to above by the expression: "substantially maintaining the degree of polymerization of the polyglucose", the reactions can be carried out with pyridine from the sulfonylation to the oxidation into aldehyde and to other functional groups all in a same reactor without the need of isolation and purification. When the product needed is obtained, water is added that precipitates out the product or in the case of water soluble products, the products are isolated by dialysis. The following Examples will serve to illustrate particular embodiments of the invention.

EXAMPLE 1

POLYALDEHYDE

Cellulose acetate 1 part by weight, (1 part) in pyridine (10 parts, reagent grade) was treated with p-toluenesulfonyl chloride (2.0 parts) at room temperature to obtain 6-O-p,-toluenesulfonyl-2(3)-O-acetyl cellulose with low degree of substitution. The sulfonated cellulose acetate has a 2.91–3.01% sulfur content. At the end of the sulfonation time and before the working up process, a sample of the sulfonated cellulose acetate in pyridine (2.5 parts) was taken and added to dimethylsulfoxide (5.5 parts) at 150° C. The resulting brown clear solution was kept at the same temperature for 5 mins. under $N_2$ atmosphere. The solution was quickly cooled to room temperature, and then added to cooled water (5.0 parts). The resulting precipitate was taken by centrifugation then dialyzed against water for 20 hrs. The slightly coloured precipitate was isolated by centrifugation, dried at room temperature (r.t.) under reduced pressure for 48 hours (hrs) then at 80° C. for 10 hrs under vacuum to obtain (0.15 parts) of polyaldehyde cellulose acetate.

EXAMPLE 2

POLYALDEHYDE

A sample of cellulose acetate sulfonate (1 part) with a sulfur content of 2.96% was added to DMSO (22 parts) containing sodium bicarbonate (1 part) at 150° C. The dark brown solution was kept at that temperature for 5 min. under $N_2$. The solution was quickly cooled to room temperature then added to a water-ice mixture (20 parts). The resulting precipitate was isolated by centrifugation and washed with water a few times, then dialyzed against water for 4 days. A black solid material was obtained by lyophilization to give a polyaldehyde cellulose derivative (0.32 parts).

EXAMPLE 3

POLYALDEHYDE

Cellulose acetate sulfonate (1 part) was added to DMSO (100 ml) containing S-Collidine (1 part) at 150°–160° C. (The Collidine was added immediately before addition of the sulfonate.) The slightly yellow solution was kept at that temperature for 5 minutes under $N_2$. The solution was quickly cooled to room temperature then added to a water-ice mixture (20 parts). The resulting precipitate was isolated by centrifugation and washed with water twice and dialyzed against water for 4 days, then isolated by centrifugation. The obtained polyaldehyde cellulose acetate was dried at room temperature and then at 50° C. under reduces pressure to give (0.8 parts) of the polyaldehyde compound.

EXAMPLE 4

POLYAMINE

Polyaldehyde cellulose acetate (1 part) was stirred in DMSO (55 parts) for ½ hr at room temperature. To this solution was added ammonium acetate (1 part) followed by sodium cyanoborohydride (1 part) and the mixture stirred at room temperature for 90 hrs. Water was added (140 parts) and the precipitate was isolated by centrifugation and then dialyzed against water for 2 days to give after lyophilization (0.7 parts) of polyamine cellulose acetate with N-content 0.35–0.38%.

EXAMPLE 5

POLYHYDRAZINE

Polyaldehyde cellulose acetate obtained from Example 1 (1 part) was dissolved with stirring in 2-methoxyethanol (100 parts) for 15 min. To this, a solution of 2,4-dinitrophenyl hydrazine (0.5 parts) in 2-methoxyethanol (100 parts) containing hydrochloric acid (20 parts, 1.5N) was added. The resulting orange solution was stirred at room temperature for 20 hrs. The sample was dialyzed for 5 days against water. The resulting precipitate was isolated by centrifugation, dried at room temperature under reduced pressure to give (0.6 parts) of polyhydrazine cellulose acetate with N-content 1.18-1.22%.

EXAMPLE 6

POLYCARBOXY CELLULOSE

Polyaldehyde cellulose acetate (1 part) was stirred in DMSO (100 parts) for 15 min. To this, a solution of sodium hydroxide (10 parts, 1N) was added, followed by sodium hypochloride solution (20 parts). The resulting slightly orange solution was stirred at r.t. for 24 hrs. The reaction mixture was purified by dialysis against water for 40 hrs. The resulting solution was lyophilized to give a polycarboxy cellulose product (0.5 parts). This will serve to illustrate the cationic affinity of the product for metals e.g. in/or extraction, softeners and in elutriation processes. The polycarboxycellulose sodium salt (1 part) was converted to corresponding polyacids using a Dowex 50W, H+ column, then the pH of the solution was adjusted to pH 3 by slow addition of hydrochloric acid (1N). To this calcium hydroxide was added and the pH adjusted to pH 10. The mixture was stirred at the same conditions for 15 minutes. The reaction mixture was purified by dialysis against water for 2 days. The resulting solution was lyophilized to give polycarboxy calcium salt (0.3 parts) showing a calcium capacity of 0.75 m.mol.gm$^{-1}$. As can be seen, this product may be used to bind metals, such as for instance, calcium.

EXAMPLE 7

POLYALDHYDE CELLULOSE HAVING ACETATE GROUP REMOVED

Polyaldehyde cellulose acetate (1 part) was treated with an acetone-water mixture (100 parts, 4:1 V/V) for ½ hr at room temperature. To this, sodium hydroxide (30 parts, 1N) was added followed by water (50 parts). The slightly yellow suspension was stirred for 24 hrs. The mixture was dialyzed against water for 40 hrs, then lyophilized to give polyaldehyde cellulose (0.5 parts).

EXAMPLE 8

POLYALDHYDE CELLULOSE

Cellulose sulfonate to be used as starting polyglucosic product was prepared as follows: Regenerated cellulose (obtained from cellulose acetate) having generally increased solubility over non-regenerated (1 part) was treated with pyridine (37 parts) at room temperature overnight, then at 70° C. for 24 hrs. The solution was slowly cooled to room temperature and to this para(P)-toluenesulfonyl chloride (12 parts) was added and the mixture stirred at room temperature for two days. A portion of the pyridine solution (10 parts) was taken for oxidation, while the rest of the mixture was treated according to known method to isolate the cellulose P-toluenesulfonate derivative with S-content of 12.49%. R.T. 14.51 minutes.

The pyridine fraction of cellulose sulfonate was added to dimethylsulfoxide (20 parts) at 150° C. under N$_2$ atmosphere. The resulting brown clear solution was kept at the same conditions for 15 minutes. The dark brown solution was quickly cooled to room temperature in an ice-water bath and divided into two parts. The first fraction was added to an ice-water mixture (5 parts), then dialyzed against water for 3 days. The dark brown solution was lophilized to give (0.4 parts) of the polyaldehyde derivative as a dark brown fluffy material.

The second fraction was treated with the addition of anhydrous ammonia gas in the presence of sodium cyanoborohydride (0.2 parts). The ammonia gas addition was stopped after 90 minutes and the mixture continued stirring for 48 hrs. The resulting dark greenish solution was purified by dialysis against water for 5 days. A fine dark brown material was obtained by lyophilization to give (0.8 parts) of the polyamine derivative with N-content of 4.65%.

Cellulose sulfonate was obtained above (1 part) was added to dimethyl sulfoxide (22 parts) at 150° C. under nitrogen atmosphere for 5 minutes. The slightly brown solution was quickly cooled to room temperature and divided into two parts. The first portion was added to an ice-water mixture (20 parts). The resulting precipitate was isolated by centrifugation and washed twice with water and dialyzed against water for 3 days, then isolated by centrifugation. The obtained aldehyde was dried at room temperature, then at 50° C. under reduced pressure to give (0.4 parts) of polyaldehyde product. The second portion of the oxydized solution was treated with anhydrous ammonia gas and sodium cyanoborohydride (0.2 parts) for 16 hrs. After continued stirring at room temperature for 48 hrs, the dark brown solution was dialyzed for 5 days against water, then lyophillized to give (0.32 parts) of the polyaminated cellulose. (N-content 1.67%). R.T. 14.45 minutes for the polyaldhyde and the polyaminated products as against R.T. 14.51 minutes for the starting polyglucose.

EXAMPLE 9

Cellulose sulfonate, obtained as in Example 8, (1 part) was added to dimethylsulfoxide (22 parts) containing pyridine (0.2 parts) at 150° C. for 5 minutes under a nitrogen atmosphere and treated as described in Example 8, to give (0.34 parts) of the polyaldehyde derivative and (0.32 parts) of the polyamine cellulose derivative N-content 1.11%. R.T. 14.60 and 14.54 minutes respectively as against R.T. 14.51 minutes for the starting polyglucose.

EXAMPLE 10

Cellulose sulfonate obtained as in Example 8 (1 part) was added to dimethylsusulfoxide (22 parts containing S-collidine (0.2 parts) at 150° C. for 5 minutes under nitrogen atmosphere and treated as described in Example 8 to give (0.32 parts) of polyaldehyde cellulose R.T. 14.19 minutes as against R.T. 14.51 for the starting polyglucose and (0.10 parts) of the aminated derivative with N-content 1.6%.

EXAMPLE 11

Cellulose sulfonate (1 part) obtained as in Example 8, was added to dimethylsulfoxide (22 parts) containing sodium hydrogen carbonate (0.1 part) at 150° C. for 5 minutes under nitrogen atmosphere and treated as previously described in Example 8 to give (0.32 parts) of slightly coloured fluffy polyaldehyde derivative and the aminated cellulose (0.26 parts) N-content 2.07%. R.T. 14.10 and 14.26 minutes respectively as against R.T. 14.51 for starting polyglucose.

EXAMPLE 12

Alpha cellulose (Sigma) (1 part) was activated by the solvent exchange method "WAN-drying" as described elsewhere. The dry cellulose sample was treated with pyridine and P-toluenesulfonyl chloride as Example 8, to obtain cellulose sulfonate (S-content 11.34%). At the end of the sulfonation time period and before the work-up process, a sample of cellulose sulfonate in pyridine was oxidized and aminated as described in Example 8. A dark brown fluffy polyaldehyde derivative was obtained (0.36 parts) and also the polyamine cellulose (0.27 parts) as a fine dark brown material. (N-content 4.27%).

EXAMPLE 13

Native cellulose fibrous (Baker, TLC type) was activated by the solvent exchange technique "WAN-drying". Two samples of dry activated cellulose (1 part) each were treated separately under the same conditions. With P-toluenesulfonyl chloride in pyridine as described in Example 8. One of the samples was worked up to obtain cellulose sulfonate (S-content 11.5%). The other sample was oxidized and aminated as described in Example 4, to give (0.28 parts) of polyaldehyde cellulose and (0.48 parts) of the polyaminated cellulose. (N-content 1.9%).

EXAMPLE 14

Amylose (Amylose, Potato, MW. over 150,000 Aldrich) was treated with P-toluenesulfonyl chloride in pyridine as described elsewhere to give anylose sulfonate. (S-content 6.5%). In a typical experiment, amylose (1 part) was treated with pyridine (20 parts) at 35°-40° C. and stirred at that temperature for 90 minutes then cooled slowly to room temperature. To this P-toluenesulfonyl chloride (5 parts) was added and the mixture stirred at that temperature for 60 hours. The pyridine solution was added to dimethylsulfoxide (77 parts) at 150° C. of polyaldehyde amylose and (0.2 parts) of polyaminated amylose. (N-content 1.1%).

EXAMPLE 15

Polyaldehyde cellulose (1 part) was treated with N,N-dimethylformamide-water (200 parts, 1.5:1 V/V). To this, long chain-alkylamine derivatized controlled pore glass (2.7 parts) Pierce, No. 24108) was added followed by sodium cyanoborohydride (1.5 parts) and stirred at room temperature for 5 days. The mixture was filtered, washed with water and dried at room temperature, then at 50° C. under reduced pressure to give (0.6 parts). (N-content 2.11%).

EXAMPLE 16

Polyaldehyde cellulose (1 part) was suspended in sodium chloride solution (167 parts, 10% pH-8) to this trypsin (4 parts, Sigma) was added followed by sodium cyanoborohydride (3.0 parts) and stirred at room temperature for 5 days, filtered, washed with water and dried at room temperature then at 50° C. under reduced pressure to give (3.4 parts) material. (N-content 0.58%).

EXAMPLE 17

Polyaldehyde cellulose derivative obtained from Example 3 (1 part) was treated with 2-methoxyethanol (48 parts) for ½ hr. To this solution of 2,4-dinitrophenyl hydrazine (0.5 parts) in 2-methoxyethanol (48 parts) was added followed by hydrochloric acid (6 parts, 1N). The clear brown solution was treated as in Example 5. A fluffy precipitate was observed in the membrane tube which was isolated by centrifugation, washed with ethanol and then dialyzed for 2 days to give after hyophilization (0.8 parts) of the polyhydrazine cellulose derivative. (N-content 2.35%).

Having described the invention, modifications will be evident to those skilled in the art without departing from the spirit of the invention, as defined in the appended claims.

We claim:

1. A method to selectively oxidize a polyglucose on the oxygen of the hydroxyl groups of the C-6 position of the glucose rings, the degree of polymerization of the polyglucose remaining substantially the same, comprising heating a 6-sulfonyl polyglucose with dimethyl sulfoxide (DMSO) in the presence of at least a catalytic amount of a catalyst selected from the group consisting of:
    symmetrical-collidine,
    sodium bicarbonate and
    pyridine,
to produce a polyglucose having aldehyde groups on the oxygen of the hydroxyl on the C-6 position of the glucose rings.

2. A method as defined in claim 1 wherein said 6-sulfonyl polyglucose is 6-O-ptoluenesulfonyl polyglucose.

3. The method as defined in claim 1 wherein said 6-sulfonyl polyglucose is 6-O-p-toluene sulfonyl polyglucose, and is obtained in situ by:
    (a) wetting a compatible polyglucose in pyridine,
    (b) reacting said polyglucose in said pyridine with about three stoichiometric amounts of para-toluene sulfonyl chloride per mole of glucose unit thereby obtaining in suspension in said pyridine said 6-O-p-toluenesulfonyl polyclucose, and without purification or isolation directly adding said DMSO, wherein the pyridine from step (a) above, is acting as a catalyst, and simultaneously as solvent to produce said polyglucose having aldehyde groups on the C-6 position.

4. The method as defined in claim 3 wherein the polyglucose is cellulose.

5. The method as defined in claim 3 wherein the polyglucose is cellulose acetate.

6. The method as defined in claim 3 wherein the polyglucosic product is a mixture of cellulose diacetate and cellulose triacetate.

7. The method as defined in claim 3 wherein the polyglucose is dextrin or amylose.

8. The method as defined in claim 1 wherein said heating is conducted at 150±10° C.

9. The method as defined in claim 1 which includes after step b, adding a member selected from the group consisting of ammonium acetate, ammonia, and secondary amines, to obtain C-6 amide.

10. The method as defined in claim 1 which includes after step b adding a member selected from the class consisting of 2, 4 dinitrophenyl hydrazine and hydrazine to obtain the hydrazine derivative on the C-6 position of the glucose rings.

11. The method as defined in claim 1 wherein after step b, further oxidation of said aldehyde groups is carried out to obtain the carboxylate function on the C-6 position of the glucose rings.

12. The method as defined in claim 11 wherein sodium hypochlorite in alkaline medium is used to produce said carboxylate function.

13. The method as defined in claim 3 wherein water is added to precipitate out said polyglucose having aldehyde groups on the C-6 position.

14. The method as defined in claim 1 wherein water is added to precipitate out said polyglucose having aldehyde groups on the C-6 position.

15. The method as defined in claim 3 which further includes treating said polyglucose having aldehyde groups on the C-6 position with a primary amine and thereby obtaining a polyglucosic product having secondary amine sites on the C-6 position of the glucose rings.

16. The method according to claim 3 wherein the polyglucose is a cellulose acetate, and which further includes hydrolyzing the acetate groups of said polyglucose having aldehyde groups, with a member of the group consisting of Lewis acid or a Lewis base to remove the acetate groups from said polyglucose having the aldehyde groups.

17. The method according to claim 15 wherein said polyglucose is cellulose.

18. The method according to claim 15 wherein said polyglucose is cyclodextrin.

19. The product obtained by the method of claim 1.
20. The product obtained by the method of claim 4.
21. The product obtained by the method of claim 5.
22. The product obtained by the method of claim 6.
23. The product obtained by the method of claim 7.
24. The product obtained by the method of claim 9.
25. The product obtained by the method of claim 10.
26. The product obtained by the method of claim 11.
27. The product obtained by the method of claim 15.
28. The product obtained by the method of claim 17.

29. The method as defined in claim 9 wherein said member is added under reducing conditions to obtain a C-6 amine.

30. The method as defined in claim 29 wherein a member selected from the groups consisting of sodium cyanoborohydride, sodium borohydride, or catalytic reduction generates said reducing conditions to obtain stable amines.

31. The product obtained by the method of claim 29.

* * * * *